United States Patent
Kim et al.

(10) Patent No.: US 10,325,201 B1
(45) Date of Patent: Jun. 18, 2019

(54) METHOD AND DEVICE FOR GENERATING DECEIVABLE COMPOSITE IMAGE BY USING GAN INCLUDING GENERATING NEURAL NETWORK AND DISCRIMINATING NEURAL NETWORK TO ALLOW SURVEILLANCE SYSTEM TO RECOGNIZE SURROUNDINGS AND DETECT RARE EVENT MORE ACCURATELY

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/262,980

(22) Filed: Jan. 31, 2019

(51) Int. Cl.
| G06K 9/00 | (2006.01) |
| G06N 3/08 | (2006.01) |
| G06K 9/62 | (2006.01) |
| G06N 3/04 | (2006.01) |

(52) U.S. Cl.
CPC .......... *G06N 3/084* (2013.01); *G06K 9/00718* (2013.01); *G06K 9/6288* (2013.01); *G06N 3/0454* (2013.01); *G06N 3/088* (2013.01); *G06K 2009/00738* (2013.01)

(58) Field of Classification Search
None
See application file for complete search history.

(56) References Cited

U.S. PATENT DOCUMENTS

| 10,013,773 | B1* | 7/2018 | Ogale | G06K 9/00791 |
| 10,049,308 | B1* | 8/2018 | Dhua | G06K 9/4628 |
| 10,176,405 | B1* | 1/2019 | Zhou | G06K 9/6269 |
| 10,210,631 | B1* | 2/2019 | Cinnamon | G06T 11/003 |

(Continued)

*Primary Examiner* — Shervin K Nakhjavan
(74) *Attorney, Agent, or Firm* — Xsensus LLP (57) ABSTRACT

A method for generating a deceivable composite image by using a GAN (Generative Adversarial Network) including a generating and a discriminating neural network to allow a surveillance system to recognize surroundings and detect a rare event, such as hazardous situations, more accurately by using a heterogeneous sensor fusion is provided. The method includes steps of: a computing device, generating location candidates of a rare object on a background image, and selecting a specific location candidate among the location candidates as an optimal location of the rare object by referring to candidate scores; inserting a rare object image into the optimal location, generating an initial composite image; and adjusting color values corresponding to each of pixels in the initial composite image, generating the deceivable composite image. Further, the method may be applicable to a pedestrian assistant system and a route planning by using 3D maps, GPS, smartphones, V2X communications, etc.

24 Claims, 3 Drawing Sheets

(56) References Cited

U.S. PATENT DOCUMENTS

| | | | |
|---|---|---|---|
| 2015/0170002 A1* | 6/2015 | Szegedy | G06K 9/66 |
| | | | 382/156 |
| 2018/0174052 A1* | 6/2018 | Rippel | H04N 19/126 |
| 2018/0253866 A1* | 9/2018 | Jain | G06K 9/628 |
| 2018/0285686 A1* | 10/2018 | Pinheiro | G06F 15/76 |
| 2018/0286034 A1* | 10/2018 | Lim | G06K 9/00973 |
| 2018/0286055 A1* | 10/2018 | Lim | G06T 7/215 |
| 2018/0293713 A1* | 10/2018 | Vogels | G06T 7/0002 |
| 2018/0293734 A1* | 10/2018 | Lim | G06N 3/04 |
| 2018/0342069 A1* | 11/2018 | Lim | G06T 7/246 |

\* cited by examiner

FIG. 1

METHOD AND DEVICE FOR GENERATING DECEIVABLE COMPOSITE IMAGE BY USING GAN INCLUDING GENERATING NEURAL NETWORK AND DISCRIMINATING NEURAL NETWORK TO ALLOW SURVEILLANCE SYSTEM TO RECOGNIZE SURROUNDINGS AND DETECT RARE EVENT MORE ACCURATELY

FIELD OF THE DISCLOSURE

The present disclosure relates to a method and a device for use with an autonomous vehicle; and more particularly, to the method and the device for generating a deceivable composite image by using a GAN (Generative Adversarial Network) to allow a surveillance system to detect a rare event more accurately, and a testing method and a testing device using the same.

BACKGROUND OF THE DISCLOSURE

Deep Convolution Neural Networks (Deep CNNs) are at the heart of the remarkable development in deep learning. CNNs have already been used in the 90's to solve problems of character recognition, but their use has become as widespread as it is now thanks to recent researches. These CNNs won the 2012 ImageNet image classification tournament, crushing other competitors. Then, the convolutional neural network became a very useful tool in the field of the machine learning.

As such, the CNNs can be used for surveillance systems of protected facilities like banks, military bases, etc. That is, the CNNs processes CCTV video data for detection of rare events in real-time, for example, robbers breaking into the banks or breach of perimeter by an enemy. It will be faster and more efficient to operate and manage the surveillance systems than conventional human monitoring of the CCTV video data.

However, implementation of the surveillance systems as such is difficult because training images to be used for learning the CNNs are scarce. The learning of the CNNs requires more than tens of thousands of the training images, but the training images related to the rare events are very rare by definition. As a result, the learning of the CNNs is difficult and the surveillance systems as such are still impractical.

SUMMARY OF THE DISCLOSURE

It is an object of the present disclosure to solve all the aforementioned problems.

It is another object of the present disclosure to provide a method for generating at least one deceivable image by using a GAN (Generative Adversarial Network) including a generating neural network and a discriminating neural network to allow a surveillance system to detect at least one rare event more accurately.

In accordance with one aspect of the present disclosure, there is provided a method for generating at least one deceivable composite image by using a GAN (Generative Adversarial Network) including a generating neural network and a discriminating neural network to allow a surveillance system to detect at least one rare event more accurately, including steps of: (a) a computing device, if at least one background image to be used as a background of the rare event on the deceivable composite image and at least one rare object image of at least one rare object corresponding to the rare event are acquired, instructing at least one locating layer in the generating neural network to generate one or more location candidates of the rare object on the background image into which the rare object image is to be inserted, and if each of candidate scores of each of the location candidates calculated by at least one first discriminator is acquired, instructing the locating layer to select a specific location candidate among the location candidates as an optimal location of the rare object by referring to the candidate scores; (b) the computing device instructing at least one compositing layer in the generating neural network to insert the rare object image into the optimal location, to thereby generate at least one initial composite image; and (c) the computing device instructing at least one adjusting layer in the generating neural network to adjust color values corresponding to at least part of each of pixels in the initial composite image, to thereby generate the deceivable composite image.

As one example, at the step of (c), the computing device instructs the adjusting layer to apply at least one convolution operation and at least one deconvolution operation to at least one specific region, corresponding to at least part of the initial composite image, into which the rare object image is inserted, to thereby generate the deceivable composite image.

As one example, the method further includes a step of: (d) the computing device, if at least part of at least one deceivability score, of the deceivable composite image, calculated by at least one second discriminator and at least one existence score, of the rare object in the deceivable composite image, calculated by an object detection network are acquired, instructing at least one loss layer in the generating neural network to calculate one or more losses by referring to at least part of the deceivability score and the existence score, to thereby learn at least part of one or more parameters of the generating neural network by backpropagating the losses.

As one example, the second discriminator determines whether its input image is the deceivable composite image or a non-composite real image, to thereby calculate the deceivability score.

As one example, the object detection network determines at least one probability of existence of the rare object in the deceivable composite image, to thereby calculate the existence score.

As one example, the second discriminator is learned to determine whether its input image is real or fake by referring to (i) the deceivable composite image (ii) a non-composite real image, and (iii) at least one GT, corresponding to the non-composite real image and the deceivable composite image, representing whether the input image is the deceivable composite image or the non-composite real image.

As one example, the object detection network has been learned to calculate at least one probability of the rare object being in its input image by referring to (i) a first group of training images including the rare object, (ii) a second group of training images not including the rare object, and (iii) at least one GT, corresponding to the first group and the second group, representing whether the input image includes the rare object.

As one example, at the step of (a), the locating layer (i) generates one or more background-object bounding boxes including background objects in the background image, and (ii) additionally generates each of rare-object bounding boxes corresponding to the rare object on each of the location candidates, to thereby generate each of composite layouts, on the background image, and the first discriminator calculates each of the candidate scores by referring to at least part of the composite layouts.

As one example, the first discriminator calculates each of probabilities of each of the composite layouts being determined as real or fake, to thereby calculate each of the candidate scores.

As one example, the first discriminator is learned to determine whether each of its input layouts is real or fake by referring to (i) each of the composite layouts, (ii) each of real layouts, and (iii) at least one GT, corresponding to each of the real layouts and each of the composite layouts, representing whether each of the input layouts is each of the real layouts or each of the composite layouts.

As one example, specific background-object bounding boxes and a specific rare-object bounding box include specific identification information generated by referring to class information on specific background objects and on a specific rare object wherein the specific background-object bounding boxes and the specific rare-object bounding box are included in a specific composite layout among the composite layouts, and the first discriminator calculates a specific candidate score by referring to (i) the specific identification information and (ii) relation information on locations of the specific background-object bounding boxes and the specific rare-object bounding box.

In accordance with another aspect of the present disclosure, there is provided a method for testing of generating at least one deceivable composite test image by using a GAN (Generative Adversarial Network) including a generating neural network and a discriminating neural network to allow a surveillance system to detect at least one rare event more accurately, including steps of: (a) a testing device, on condition that (1) a learning device, after acquiring at least one background training image to be used as a background of the rare event on the deceivable composite training image and at least one rare object training image of at least one rare object for training corresponding to the rare event, has performed processes of instructing at least one locating layer in the generating neural network to generate one or more location candidates for training of the rare object for training on the background training image into which the rare object training image is to be inserted, and after acquiring each of candidate scores for training of each of the location candidates for training calculated by at least one first discriminator, instructing the locating layer to select a specific location candidate for training among the location candidates for training as an optimal location for training of the rare object for training by referring to the candidate scores for training, (2) the learning device has instructed at least one compositing layer in the generating neural network to insert the rare object training image into the optimal location for training, to thereby generate at least one initial composite training image, (3) the learning device has instructed at least one adjusting layer in the generating neural network to adjust color values for training corresponding to at least part of each of pixels in the initial composite training image, to thereby generate the deceivable composite training image, and (4) the learning device, after acquiring at least part of at least one deceivability score for training, of the deceivable composite training image, calculated by at least one second discriminator and at least one existence score for training, of the rare object for training in the deceivable composite training image, calculated by an object detection network, has instructed at least one loss layer in the generating neural network to calculate one or more losses by referring to at least part of the deceivability score for training and the existence score for training, to thereby learn at least part of one or more parameters of the generating neural network by backpropagating the losses; if at least one background test image to be used as a background of the rare event on the deceivable composite test image and at least one rare object test image of at least one rare object for testing corresponding to the rare event are acquired, instructing the locating layer in the generating neural network to generate one or more location candidates for testing of the rare object for testing on the background test image into which the rare object test image is to be inserted, and if each of candidate scores for testing of each of the location candidates for testing calculated by the first discriminator is acquired, instructing the locating layer to select a specific location candidate for testing among the location candidates for testing as an optimal location for testing of the rare object for testing by referring to the candidate scores for testing; (b) the testing device instructing the compositing layer in the generating neural network to insert the rare object test image into the optimal location for testing, to thereby generate at least one initial composite test image; and (c) the testing device instructing the adjusting layer in the generating neural network to adjust color values for testing corresponding to at least part of each of pixels in the initial composite test image, to thereby generate the deceivable composite test image.

In accordance with still another aspect of the present disclosure, there is provided a computing device for generating at least one deceivable composite image by using a GAN (Generative Adversarial Network) including a generating neural network and a discriminating neural network to allow a surveillance system to detect at least one rare event more accurately, including: at least one memory that stores instructions; and at least one processor configured to execute the instructions to: perform processes of (I), if at least one background image to be used as a background of the rare event on the deceivable composite image and at least one rare object image of at least one rare object corresponding to the rare event are acquired, instructing at least one locating layer in the generating neural network to generate one or more location candidates of the rare object on the background image into which the rare object image is to be inserted, and if each of candidate scores of each of the location candidates calculated by at least one first discriminator is acquired, instructing the locating layer to select a specific location candidate among the location candidates as an optimal location of the rare object by referring to the candidate scores, (II) instructing at least one compositing layer in the generating neural network to insert the rare object image into the optimal location, to thereby generate at least one initial composite image, and (III) instructing at least one adjusting layer in the generating neural network to adjust color values corresponding to at least part of each of pixels in the initial composite image, to thereby generate the deceivable composite image.

As one example, at the process of (III), the processor instructs the adjusting layer to apply at least one convolution operation and at least one deconvolution operation to at least one specific region, corresponding to at least part of the initial composite image, into which the rare object image is inserted, to thereby generate the deceivable composite image.

As one example, the processor further performs a process of (IV), if at least part of at least one deceivability score, of the deceivable composite image, calculated by at least one second discriminator and at least one existence score, of the rare object in the deceivable composite image, calculated by an object detection network are acquired, instructing at least one loss layer in the generating neural network to calculate one or more losses by referring to at least part of the deceivability score and the existence score, to thereby learn at least part of one or more parameters of the generating neural network by backpropagating the losses.

As one example, the second discriminator determines whether its input image is the deceivable composite image or a non-composite real image, to thereby calculate the deceivability score.

As one example, the object detection network determines at least one probability of existence of the rare object in the deceivable composite image, to thereby calculate the existence score.

As one example, the second discriminator is learned to determine whether its input image is real or fake by referring to (i) the deceivable composite image (ii) a non-composite real image, and (iii) at least one GT, corresponding to the non-composite real image and the deceivable composite image, representing whether the input image is the deceivable composite image or the non-composite real image.

As one example, the object detection network has been learned to calculate at least one probability of the rare object being in its input image by referring to (i) a first group of training images including the rare object, (ii) a second group of training images not including the rare object, and (iii) at least one GT, corresponding to the first group and the second group, representing whether the input image includes the rare object.

As one example, at the process of (I), the locating layer (i) generates one or more background-object bounding boxes including background objects in the background image, and (ii) additionally generates each of rare-object bounding boxes corresponding to the rare object on each of the location candidates, to thereby generate each of composite layouts, on the background image, and the first discriminator calculates each of the candidate scores by referring to at least part of the composite layouts.

As one example, the first discriminator calculates each of probabilities of each of the composite layouts being determined as real or fake, to thereby calculate each of the candidate scores.

As one example, the first discriminator is learned to determine whether each of its input layouts is real or fake by referring to (i) each of the composite layouts, (ii) each of real layouts, and (iii) at least one GT, corresponding to each of the real layouts and each of the composite layouts, representing whether each of the input layouts is each of the real layouts or each of the composite layouts.

As one example, specific background-object bounding boxes and a specific rare-object bounding box include specific identification information generated by referring to class information on specific background objects and on a specific rare object wherein the specific background-object bounding boxes and the specific rare-object bounding box are included in a specific composite layout among the composite layouts, and the first discriminator calculates a specific candidate score by referring to (i) the specific identification information and (ii) relation information on locations of the specific background-object bounding boxes and the specific rare-object bounding box.

In accordance with still yet another aspect of the present disclosure, there is provided a testing device for testing of generating at least one deceivable composite test image by using a GAN (Generative Adversarial Network) including a generating neural network and a discriminating neural network to allow a surveillance system to detect at least one rare event more accurately, including: at least one memory that stores instructions; and at least one processor, on condition that a learning device (1) after acquiring at least one background training image to be used as a background of the rare event on the deceivable composite training image and at least one rare object training image of at least one rare object for training corresponding to the rare event, has performed processes of instructing at least one locating layer in the generating neural network to generate one or more location candidates for training of the rare object for training on the background training image into which the rare object training image is to be inserted, and after acquiring each of candidate scores for training of each of the location candidates for training calculated by at least one first discriminator, instructing the locating layer to select a specific location candidate for training among the location candidates for training as an optimal location for training of the rare object for training by referring to the candidate scores for training, (2) has instructed at least one compositing layer in the generating neural network to insert the rare object training image into the optimal location for training, to thereby generate at least one initial composite training image, (3) has instructed at least one adjusting layer in the generating neural network to adjust color values for training corresponding to at least part of each of pixels in the initial composite training image, to thereby generate the deceivable composite training image, and (4), after acquiring at least part of at least one deceivability score for training, of the deceivable composite training image, calculated by at least one second discriminator and at least one existence score for training, of the rare object for training in the deceivable composite training image, calculated by an object detection network, has instructed at least one loss layer in the generating neural network to calculate one or more losses by referring to at least part of the deceivability score for training and the existence score for training, to thereby learn at least part of one or more parameters of the generating neural network by backpropagating the losses; configured to execute the instructions to: perform processes of (I), if at least one background test image to be used as a background of the rare event on the deceivable composite test image and at least one rare object test image of at least one rare object for testing corresponding to the rare event are acquired, instructing the locating layer in the generating neural network to generate one or more location candidates for testing of the rare object for testing on the background test image into which the rare object test image is to be inserted, and if each of candidate scores for testing of each of the location candidates for testing calculated by the first discriminator is acquired, instructing the locating layer to select a specific location candidate for testing among the location candidates for testing as an optimal location for testing of the rare object for testing by referring to the candidate scores for testing, (II) instructing the compositing layer in the generating neural network to insert the rare object test image into the optimal location for testing, to thereby generate at least one initial composite test image, and (III) instructing the adjusting layer in the generating neural network to adjust color values for testing corresponding to at least part of each of pixels in the initial composite test image, to thereby generate the deceivable composite test image.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained base on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
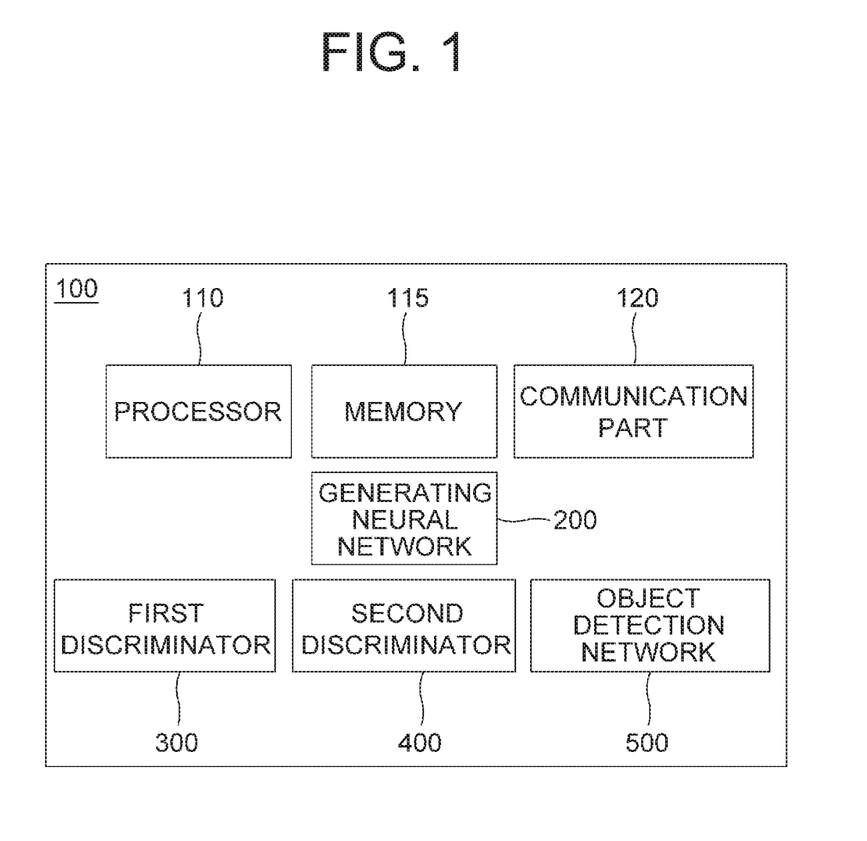
FIG. 1 is a drawing schematically illustrating a configuration of a computing device for generating at least one deceivable composite image by using a GAN (Generative Adversarial Network) including a generating neural network and a discriminating neural network to allow a surveillance system to detect at least one rare event more accurately.

FIG. 1 is a drawing schematically illustrating a configuration of a computing device for generating at least one deceivable composite image by using a GAN (Generative Adversarial Network) including a generating neural network and a discriminating neural network to allow a surveillance system to detect at least one rare event more accurately.

By referring to FIG. 1, the computing device 100 may include the generating neural network 200, at least one first discriminator 300, at least one second discriminator 400, and at least one object detection network 500, to be described in detail later. Processes of input, output and computation of the generating neural network 200, discriminating neural network which includes the first discriminator 300 and the second discriminator 400, and the object detection network 500 may be respectively performed by a communication part 110 and a processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

A general configuration of the computing device 100 is described above, and a structure of the generating neural network 200, a vital part of the configuration, among components of the computing device 100 is described below by referring to FIG. 2.

Figure 2:
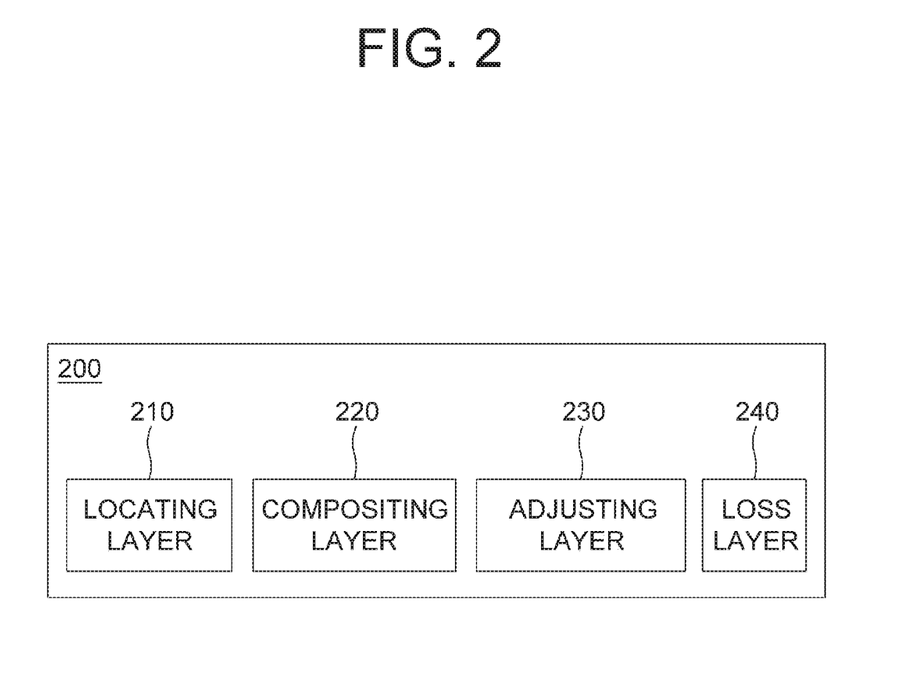
FIG. 2 is a drawing schematically illustrating a configuration of the generating neural network for generating the deceivable composite image by using the GAN including the generating neural network and the discriminating neural network to allow the surveillance system to detect the rare event more accurately.

FIG. 2 is a drawing schematically illustrating a configuration of the generating neural network for generating the deceivable composite image by using the GAN including the generating neural network and the discriminating neural network to allow the surveillance system to detect the rare event more accurately.

By referring to FIG. 2, the generating neural network 200 may include at least one locating layer 210, at least one compositing layer 220, at least one adjusting layer 230, and at least one loss layer 240. Functions of each of the layers will be explained in detail later by referring to FIG. 3. As will also be described later, when the computing device 100 functions as a testing device, the loss layer 240 may be excluded.

The configuration of the generating neural network 200 is described as above, and a method for generating the deceivable composite image in accordance with the present disclosure will be described in detail along with the first discriminator 300, the second discriminator 400, and the object detection network 500. This is explained by referring to FIG. 3.

Figure 3:
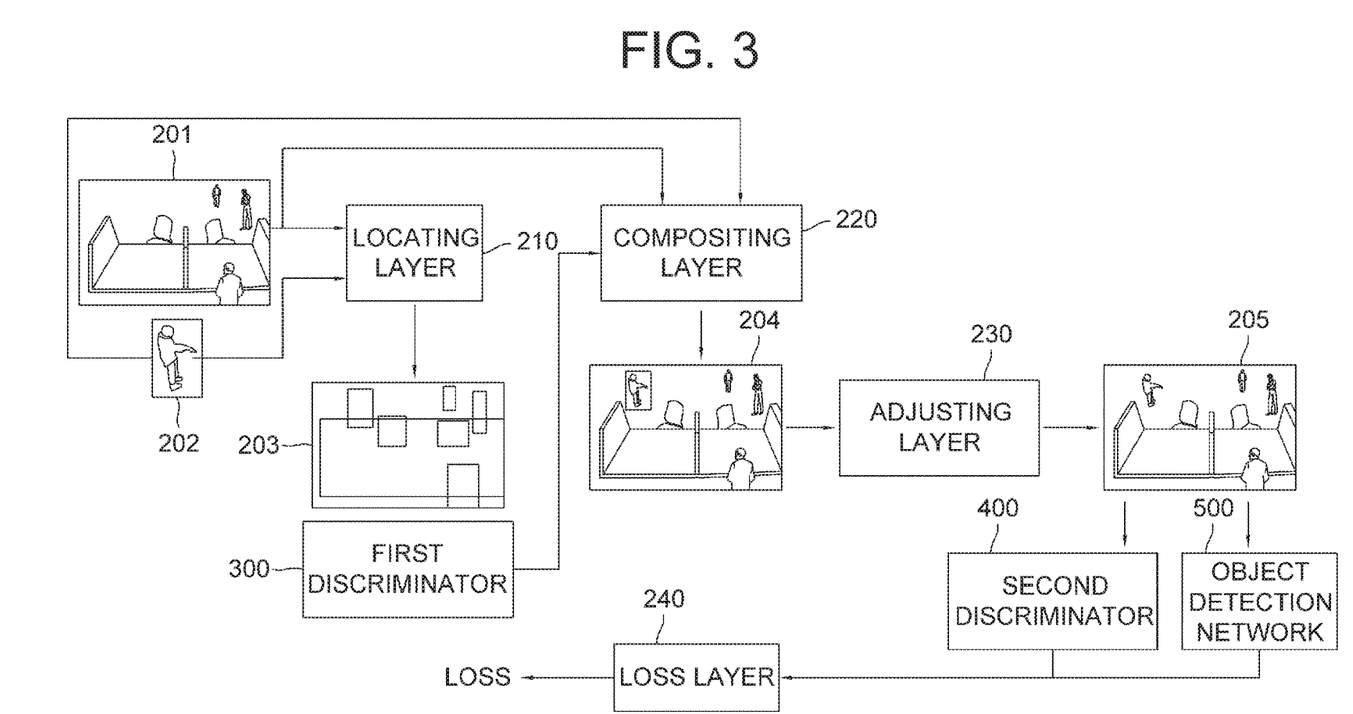
FIG. 3 is a drawing schematically illustrating a process of generating the deceivable composite image by using the GAN including the generating neural network and the discriminating neural network to allow the surveillance system to detect the rare event more accurately.

FIG. 3 is a drawing schematically illustrating a process of generating the deceivable composite image by using the GAN including the generating neural network and the discriminating neural network to allow the surveillance system to detect the rare event more accurately.

By referring to FIG. 3, the method for generating the deceivable composite image in accordance with the present disclosure is performed via interaction among the layers in the generating neural network 200, and the first discriminator 300, the second discriminator 400, and the object detection network 500.

First, to generate the deceivable composite image that can be used for learning the surveillance system, the computing device 100 may acquire at least one background image 201 to be used as a background of the rare event on the deceivable composite image and at least one rare object image 202 of at least one rare object corresponding to the rare event. Thereafter, the computing device 100 may instruct the locating layer 210 to generate one or more location candidates of the rare object on the background image 201 into which the rare object image 202 is to be inserted. The location candidates may be generated by determining a first location candidate and then repeatedly moving the first location candidate around with a certain distance in a sliding-window approach. Thereafter, the first discriminator 300 may calculate each of one or more candidate scores which corresponds to each of the location candidates.

For better calculation of the candidate scores by the first discriminator 300, the locating layer 210 may generate each of composite layouts which is to be inputted into the first discriminator 300. Specifically, the locating layer 210 may recognize one or more background objects included in the background image 201, and may generate one or more background-object bounding boxes, including the background objects, on the background image 201. Also, each of one or more rare-object bounding boxes corresponding to the rare object may be generated on each of the location candidates. Each of the composite layouts may be generated by such addition of the background-object bounding boxes and each of the rare-object bounding boxes onto the background image 201. That is, each of the composite layouts may include each of the rare-object bounding boxes corresponding to each of the composite layouts and the background-object bounding boxes. As will be explained later, the background-object bounding boxes and the rare-object bounding boxes may include specific identification information generated by referring to class information on the background objects and on the rare object. A specific composite layout 203 shown in FIG. 3 may be an example of one of the composite layouts.

After generation of the composite layouts, the first discriminator 300 may calculate each of probabilities of each of the composite layouts being determined as real or fake, to thereby calculate each of the candidate scores. Taking an example of calculating a specific candidate score of the specific composite layout 203, the first discriminator 300 may calculate the specific candidate score by referring to (i) specific identification information on specific background-object bounding boxes in the specific composite layout 203 and on a specific rare object and (ii) relation information on locations of the specific background-object bounding boxes and the specific rare-object bounding box. That is, it may be determined whether the specific composite layout looks real, that is, whether relations of locations, among the background objects and the rare object, are natural. For example, as a result of analyzing the specific identification information on the specific background-object bounding boxes, if locations of the specific background-object bounding boxes are determined as floors, and if the specific rare-object bounding box is determined as located at a same height as the specific background-object bounding boxes, then since the rare object image 203 in FIG. 3 is a robber with a gun, it is natural for the robber to be on the floor, not on a ceiling. Thus, the specific candidate score may be set as high. The first discriminator 300 may learn in parallel with the generating neural network 200 to make such a determination on the specific candidate score.

Specifically, the first discriminator 300 may acquire each of real layouts in addition to each of the composite layouts created by the generating neural network 200, and acquire at least one GT, corresponding to each of the real layouts and each of the composite layouts, representing whether each of its input layouts is each of the real layouts or each of the composite layouts. Thereafter, one or more losses may be calculated by referring to the acquired composite layouts, the acquired real layouts, and their corresponding GTs, then the first discriminator 300 may backpropagate the losses, to thereby learn to determine whether each of its input layouts is real or fake.

The first discriminator 300 may give a high candidate score to a certain composite layout, among the composite layouts, determined as having relations among locations of the specific background-object bounding boxes and the specific rare-object bounding box similar to relations among locations of corresponding components of the real layout. Therefore, a specific location candidate with the highest candidate score may be determined as an optimal location of the rare object. Determining of the optimal location is necessary because the deceivable composite image looks natural if its corresponding composite layout has the relations among the locations of its components similar to the relations among the locations of the corresponding components of the real layout.

For example, suppose a specific candidate score corresponding to the specific composite layout 203 is the highest. In this case, the specific location candidate corresponding to the specific composite layout 203 is selected as the optimal location, and the rare object image 202 will be inserted into the optimal location.

That is, the computing device 100 may instruct the compositing layer 220 in the generating neural network 200 to insert the rare object image 202 into the optimal location, to thereby generate the initial composite image 204. This initial composite image 204 generated as such is enough for subsequent processes, but it may be a bit unnatural, so additional adjustment may be needed.

Accordingly, the computing device 100 may instruct the adjusting layer 230 in the generating neural network 200 to adjust color values corresponding to at least part of each of pixels in the initial composite image 204, to thereby generate the deceivable composite image. Adjusting the color values may be done in several ways, and one example may be adjusting them by a convolution operation and a deconvolution operation.

Specifically, the computing device 100 may instruct the adjusting layer 230 to apply at least one convolution operation and at least one deconvolution operation to at least one specific region, corresponding to at least part of the initial composite image 204, into which the rare object image 202 is inserted, to thereby generate the deceivable composite image 205. Application of the convolution operation and the deconvolution operation will make the rare object image 202 look natural in the surroundings on the deceivable composite image 205.

For more natural composition of the deceivable composite image 205, a learning process using the second discriminator 400 and the object detection network 500 is required. Below, the second discriminator 400 and the object detection network 500 will be described.

First, the second discriminator 400 may determine whether its input image is the deceivable composite image 205 or a non-composite real image, to thereby calculate at least one deceivability score. That is, it may be determined whether the deceivable composite layout 205 looks natural as the non-composite real image of a real world. The second discriminator 400 may learn in parallel with the generating neural network 200 to perform such a function.

Specifically, the second discriminator 400 may acquire the non-composite real image in addition to the deceivable composite image 205 created by the generating neural network 200, and acquire at least one GT, corresponding to the non-composite real image and the deceivable composite image 205, representing whether its input image is the deceivable composite image 205 or the non-composite real image. Thereafter, one or more losses may be calculated by referring to the acquired deceivable composite image, the acquired non-composite real image, and their corresponding GTs, then the second discriminator 400 may backpropagate the losses, to thereby learn to determine whether its input image is real or fake. Herein, the non-composite real image corresponding to a purpose of a composite image desired by a user may be inputted, to thereby determine a type of the deceivable composite image after a fashion. For example, in case of a military surveillance system used for detection of an enemy, it is of the foremost importance to be able to detect an enemy soldier hiding in the grass, therefore, it is desirable for the deceivable composite image to have the enemy soldier hiding in the grass, not standing in the plain sight. Herein, if it is determined that the non-composite real image is to represent animals hiding in the grass, the deceivable composite image may show the enemy soldier hiding in the grass as above. In this case, the non-composite real image inputted does not necessarily include the rare object. That is, in the above example, a non-composite training image showing the animals hiding in the grass will be enough, but a non-composite training image showing the enemy soldier hiding in the grass is not a mandatory.

Next, the object detection network 500 may determine at least one probability of existence of the rare object in the deceivable composite image, to thereby calculate at least one existence score. As will be explained later, it is used in the learning process such that the deceivable composite image 205 always includes the rare object image 202. The object detection network 500 may have been learned to perform such a function, before the generating neural network 200 performs the learning process.

Specifically, the object detection network 500 may have acquired (i) a first group of training images including the rare object, (ii) a second group of training images not including the rare object, and (iii) at least one GT, corresponding to the first group and the second group, representing whether the input image includes the rare object. Thereafter, one or more losses may be calculated by referring to the acquired first group, the acquired second group, and their corresponding GTs, then the object detection network 500 may backpropagate the losses, to thereby learn to calculate at least one probability of the rare object being included in its input image.

On condition that the second discriminator 400 and the object detection network 500 as such have been provided, the computing device 100 may acquire at least part of (i) the deceivability score, of the deceivable composite image 205, calculated by the second discriminator 400 and (ii) the existence score, of the rare object in the deceivable composite image 205, calculated by the object detection network 500. Thereafter, the computing device 100 may instruct the loss layer 240 in the generating neural network 200 to calculate one or more losses by referring to at least part of the deceivability score and the existence score, and backpropagate the losses, to thereby learn the parameters of the generating neural network 200. Herein, parameters of the first discriminator 300, the second discriminator 400 and the object detection network 500 or any other component in the discriminating network may also be learned by the loss layer 240 or any other loss layers (not illustrated), as the case may be.

The losses may perform a function of adjusting parameters of the layers in the generating neural network 200 to allow the deceivable composite image 205 to be generated in a direction of increasing the deceivability score and the existence score.

If the deceivability score becomes high, then many of characteristics of the deceivable composite image 205 are similar to those of the non-composite real image thus making the deceivable composite image 205 look natural, and if the deceivable composite image 205 looks natural, the output performance is expected to be better when the deceivable composite image 205 is inputted into the surveillance system.

Also, if the existence score becomes high, the possibility of the generating neural network 200 learning the wrong way will be reduced. If the generating neural network 200 is learned only by using the first discriminator 300 and the second discriminator 400, it will be learned in a way of not inserting the rare object image 202 because only naturalness of the deceivable composite image is sought for. That is, this may happen because the easiest way of generating the deceivable composite image 205 that looks natural is letting the deceivable composite image 205 have only the background image 201 without the rare object image 202, but using the object detection network 500 together may prevent this from happening. By learning in a direction of increasing the existence score, the deceivable composite image 205 always includes the rare object image 202.

The generating neural network 200 may generate multiple deceivable composite images and execute the processes above multiple times, then the generating neural network 200, and the first discriminator 300 and the second discriminator 400 may be learned in parallel, and adopting the GAN where the components above learn in parallel and in competition enables generation of an optimized deceivable composite image for testing. A testing process is described below.

For reference, in the description below, the phrase "for training" or "training" is added for terms related to the learning process, and the phrase "for testing" or "testing" is added for terms related to the testing process, to avoid possible confusion.

On condition that (1) the learning device 100, after acquiring at least one background training image to be used as a background of the rare event on the deceivable composite training image and at least one rare object training image of at least one rare object for training corresponding to the rare event, has performed processes of instructing the locating layer 210 in the generating neural network 200 to generate one or more location candidates for training of the rare object for training on the background training image into which the rare object training image is to be inserted, and after acquiring each of candidate scores for training of each of the location candidates for training calculated by the first discriminator 300, instructing the locating layer 210 to select a specific location candidate for training among the location candidates for training as an optimal location for training of the rare object for training by referring to the candidate scores for training, (2) the learning device 100 has instructed the compositing layer 220 in the generating neural network 200 to insert the rare object training image into the optimal location for training, to thereby generate at least one initial composite training image, (3) the learning device 100 has instructed the adjusting layer 230 in the generating neural network 200 to adjust color values for training corresponding to at least part of each of pixels in the initial composite training image, to thereby generate the deceivable composite training image, (4) the learning device 100, after acquiring at least part of at least one deceivability score for training, of the deceivable composite training image, calculated by the second discriminator 400 and at least one existence score for training, of the rare object for training in the deceivable composite training image, calculated by the object detection network 500, has instructed the loss layer 240 in the generating neural network 200 to calculate one or more losses by referring to at least part of the deceivability score for training and the existence score for training, to thereby learn at least part of one or more parameters of the generating neural network 200 by backpropagating the losses, if at least one background test image to be used as a background of the rare event on the deceivable composite test image and at least one rare object test image of at least one rare object for testing corresponding to the rare event are acquired, a testing device (not illustrated) may instruct the locating layer 210 in the generating neural network 200 to generate one or more location candidates for testing of the rare object for testing on the background test image into which the rare object test image is to be inserted, and if each of candidate scores for testing of each of the location candidates for testing calculated by the first discriminator 300 is acquired, instructing the locating layer 210 to select a specific location candidate for testing among the location candidates for testing as an optimal location for testing of the rare object for testing by referring to the candidate scores for testing.

Then, the testing device may instruct the compositing layer 220 in the generating neural network 200 to insert the rare object test image into the optimal location for testing, to thereby generate at least one initial composite test image.

Thereafter, the testing device may instruct the adjusting layer 230 in the generating neural network 200 to adjust color values for testing corresponding to at least part of each of pixels in the initial composite test image, to thereby generate the deceivable composite test image.

The testing process above may be performed by the testing device without the loss layer 240, as aforementioned, in the generating neural network 200 in FIG. 2.

As can be understood by those skilled in the art, it is clear that communication parts of the learning device and the testing device may perform transmission of image data, for example, images described above like the original image, original labels, and additional labels, etc., and that processors and/or memories of the learning device and the testing device may retain data for feature maps and performing operations, and that the processors of the learning device and the testing device may perform convolution operations, deconvolution operations, and loss value operations, but the scope of the present disclosure is not limited thereto.

The present disclosure has an effect of providing the method for generating the deceivable image by using the GAN including the generating neural network and the discriminating neural network to allow the surveillance system to recognize surroundings and detect the rare event, such as hazardous situations, more accurately by using a heterogeneous sensor fusion.

Further, the method in accordance with the present disclosure may be applicable to a pedestrian assistant system and a route planning by using 3D maps, GPS, smartphones, V2X communications, etc.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for generating at least one deceivable composite image by using a GAN (Generative Adversarial Network) including a generating neural network and a discriminating neural network to allow a surveillance system to detect at least one rare event more accurately, comprising steps of:

(a) a computing device, if at least one background image to be used as a background of the rare event on the deceivable composite image and at least one rare object image of at least one rare object corresponding to the rare event are acquired, instructing at least one locating layer in the generating neural network to generate one or more location candidates of the rare object on the background image into which the rare object image is to be inserted, and, if each of candidate scores of each of the location candidates calculated by at least one first discriminator is acquired, instructing the locating layer to select a specific location candidate among the location candidates as an optimal location of the rare object by referring to the candidate scores;

(b) the computing device instructing at least one compositing layer in the generating neural network to insert the rare object image into the optimal location, to thereby generate at least one initial composite image; and (c) the computing device instructing at least one adjusting layer in the generating neural network to adjust color values corresponding to at least part of each of pixels in the initial composite image, to thereby generate the deceivable composite image.

2. The method of claim 1, wherein, at the step of (c), the computing device instructs the adjusting layer to apply at least one convolution operation and at least one deconvolution operation to at least one specific region, corresponding to at least part of the initial composite image, into which the rare object image is inserted, to thereby generate the deceivable composite image.

3. The method of claim 1, wherein the method further comprises a step of:
(d) the computing device, if at least part of at least one deceivability score, of the deceivable composite image, calculated by at least one second discriminator and at least one existence score, of the rare object in the deceivable composite image, calculated by an object detection network are acquired, instructing at least one loss layer in the generating neural network to calculate one or more losses by referring to at least part of the deceivability score and the existence score, to thereby learn at least part of one or more parameters of the generating neural network by backpropagating the losses.

4. The method of claim 3, wherein the second discriminator determines whether its input image is the deceivable composite image or a non-composite real image, to thereby calculate the deceivability score.

5. The method of claim 3, wherein the object detection network determines at least one probability of existence of the rare object in the deceivable composite image, to thereby calculate the existence score.

6. The method of claim 3, wherein the second discriminator is learned to determine whether its input image is real or fake by referring to (i) the deceivable composite image (ii) a non-composite real image, and (iii) at least one GT, corresponding to the non-composite real image and the deceivable composite image, representing whether the input image is the deceivable composite image or the non-composite real image.

7. The method of claim 3, wherein the object detection network has been learned to calculate at least one probability of the rare object being in its input image by referring to (i) a first group of training images including the rare object, (ii) a second group of training images not including the rare object, and (iii) at least one GT, corresponding to the first group and the second group, representing whether the input image includes the rare object.

8. The method of claim 1, wherein, at the step of (a), the locating layer (i) generates one or more background-object bounding boxes including background objects in the background image, and (ii) additionally generates each of rare-object bounding boxes corresponding to the rare object on each of the location candidates, to thereby generate each of composite layouts, on the background image, and
wherein the first discriminator calculates each of the candidate scores by referring to at least part of the composite layouts.

9. The method of claim 8, wherein the first discriminator calculates each of probabilities of each of the composite layouts being determined as real or fake, to thereby calculate each of the candidate scores.

10. The method of claim 8, wherein the first discriminator is learned to determine whether each of its input layouts is real or fake by referring to (i) each of the composite layouts, (ii) each of real layouts, and (iii) at least one GT, corresponding to each of the real layouts and each of the composite layouts, representing whether each of the input layouts is each of the real layouts or each of the composite layouts.

11. The method of claim 8, wherein specific background-object bounding boxes and a specific rare-object bounding box include specific identification information generated by referring to class information on specific background objects and on a specific rare object wherein the specific background-object bounding boxes and the specific rare-object bounding box are included in a specific composite layout among the composite layouts, and
wherein the first discriminator calculates a specific candidate score by referring to (i) the specific identification information and (ii) relation information on locations of the specific background-object bounding boxes and the specific rare-object bounding box.

12. A method for testing of generating at least one deceivable composite test image by using a GAN (Generative Adversarial Network) including a generating neural network and a discriminating neural network to allow a surveillance system to detect at least one rare event more accurately, comprising steps of:
(a) a testing device, on condition that (1) a learning device, after acquiring at least one background training image to be used as a background of the rare event on the deceivable composite training image and at least one rare object training image of at least one rare object for training corresponding to the rare event, has performed processes of instructing at least one locating layer in the generating neural network to generate one or more location candidates for training of the rare object for training on the background training image into which the rare object training image is to be inserted, and after acquiring each of candidate scores for training of each of the location candidates for training calculated by at least one first discriminator, instructing the locating layer to select a specific location candidate for training among the location candidates for training as an optimal location for training of the rare object for training by referring to the candidate scores for training, (2) the learning device has instructed at least one compositing layer in the generating neural network to insert the rare object training image into the optimal location for training, to thereby generate at least one initial composite training image, (3) the learning device has instructed at least one adjusting layer in the generating neural network to adjust color values for training corresponding to at least part of each of pixels in the initial composite training image, to thereby generate the deceivable composite training image, and (4) the learning device, after acquiring at least part of at least one deceivability score for training, of the deceivable composite training image, calculated by at least one second discriminator and at least one existence score for training, of the rare object for training in the deceivable composite training image, calculated by an object detection network, has instructed at least one loss layer in the generating neural network to calculate one or more losses by referring to at least part of the deceivability score for training and the existence score for training, to thereby learn at least part of one or more parameters of the generating neural network by backpropagating the losses; if at least one background test image to be used as a background of the rare event on the deceivable composite test image and at least one rare object test image of at least one rare object for testing corresponding to the rare event are acquired, instructing the locating layer in the generating neural network to generate one or more location candidates for testing of the rare object for testing on the background test image into which the rare object test image is to be inserted, and if each of candidate scores for testing of each of the location candidates for testing calculated by the first discriminator is acquired, instructing the locating layer to select a specific location candidate for testing among the location candidates for testing as an optimal location for testing of the rare object for testing by referring to the candidate scores for testing;

(b) the testing device instructing the compositing layer in the generating neural network to insert the rare object test image into the optimal location for testing, to thereby generate at least one initial composite test image; and (c) the testing device instructing the adjusting layer in the generating neural network to adjust color values for testing corresponding to at least part of each of pixels in the initial composite test image, to thereby generate the deceivable composite test image.

13. A computing device for generating at least one deceivable composite image by using a GAN (Generative Adversarial Network) including a generating neural network and a discriminating neural network to allow a surveillance system to detect at least one rare event more accurately, comprising:
at least one memory that stores instructions; and
at least one processor configured to execute the instructions to: perform processes of (I), if at least one background image to be used as a background of the rare event on the deceivable composite image and at least one rare object image of at least one rare object corresponding to the rare event are acquired, instructing at least one locating layer in the generating neural network to generate one or more location candidates of the rare object on the background image into which the rare object image is to be inserted, and if each of candidate scores of each of the location candidates calculated by at least one first discriminator is acquired, instructing the locating layer to select a specific location candidate among the location candidates as an optimal location of the rare object by referring to the candidate scores, (II) instructing at least one compositing layer in the generating neural network to insert the rare object image into the optimal location, to thereby generate at least one initial composite image, and (III) instructing at least one adjusting layer in the generating neural network to adjust color values corresponding to at least part of each of pixels in the initial composite image, to thereby generate the deceivable composite image.

14. The computing device of claim 13, wherein, at the process of (III), the processor instructs the adjusting layer to apply at least one convolution operation and at least one deconvolution operation to at least one specific region, corresponding to at least part of the initial composite image, into which the rare object image is inserted, to thereby generate the deceivable composite image.

15. The computing device of claim 13, wherein the processor further performs a process of (IV), if at least part of at least one deceivability score, of the deceivable composite image, calculated by at least one second discriminator and at least one existence score, of the rare object in the deceivable composite image, calculated by an object detection network are acquired, instructing at least one loss layer in the generating neural network to calculate one or more losses by referring to at least part of the deceivability score and the existence score, to thereby learn at least part of one or more parameters of the generating neural network by backpropagating the losses.

16. The computing device of claim 15, wherein the second discriminator determines whether its input image is the deceivable composite image or a non-composite real image, to thereby calculate the deceivability score.

17. The computing device of claim 15, wherein the object detection network determines at least one probability of existence of the rare object in the deceivable composite image, to thereby calculate the existence score.

18. The computing device of claim 15, wherein the second discriminator is learned to determine whether its input image is real or fake by referring to (i) the deceivable composite image (ii) a non-composite real image, and (iii) at least one GT, corresponding to the non-composite real image and the deceivable composite image, representing whether the input image is the deceivable composite image or the non-composite real image.

19. The computing device of claim 15, wherein the object detection network has been learned to calculate at least one probability of the rare object being in its input image by referring to (i) a first group of training images including the rare object, (ii) a second group of training images not including the rare object, and (iii) at least one GT, corresponding to the first group and the second group, representing whether the input image includes the rare object.

20. The computing device of claim 13, wherein, at the process of (I), the locating layer (i) generates one or more background-object bounding boxes including background objects in the background image, and (ii) additionally generates each of rare-object bounding boxes corresponding to the rare object on each of the location candidates, to thereby generate each of composite layouts, on the background image, and
wherein the first discriminator calculates each of the candidate scores by referring to at least part of the composite layouts.

21. The computing device of claim 20, wherein the first discriminator calculates each of probabilities of each of the composite layouts being determined as real or fake, to thereby calculate each of the candidate scores.

22. The computing device of claim 20, wherein the first discriminator is learned to determine whether each of its input layouts is real or fake by referring to (i) each of the composite layouts, (ii) each of real layouts, and (iii) at least one GT, corresponding to each of the real layouts and each of the composite layouts, representing whether each of the input layouts is each of the real layouts or each of the composite layouts.

23. The computing device of claim 20, wherein specific background-object bounding boxes and a specific rare-object bounding box include specific identification information generated by referring to class information on specific background objects and on a specific rare object wherein the specific background-object bounding boxes and the specific rare-object bounding box are included in a specific composite layout among the composite layouts, and wherein the first discriminator calculates a specific candidate score by referring to (i) the specific identification information and (ii) relation information on locations of the specific background-object bounding boxes and the specific rare-object bounding box.

24. A testing device for testing of generating at least one deceivable composite test image by using a GAN (Generative Adversarial Network) including a generating neural network and a discriminating neural network to allow a surveillance system to detect at least one rare event more accurately, comprising:

at least one memory that stores instructions; and at least one processor, on condition that a learning device (1), after acquiring at least one background training image to be used as a background of the rare event on the deceivable composite training image and at least one rare object training image of at least one rare object for training corresponding to the rare event, has performed processes of instructing at least one locating layer in the generating neural network to generate one or more location candidates for training of the rare object for training on the background training image into which the rare object training image is to be inserted, and after acquiring each of candidate scores for training of each of the location candidates for training calculated by at least one first discriminator, instructing the locating layer to select a specific location candidate for training among the location candidates for training as an optimal location for training of the rare object for training by referring to the candidate scores for training, (2) has instructed at least one compositing layer in the generating neural network to insert the rare object training image into the optimal location for training, to thereby generate at least one initial composite training image, (3) has instructed at least one adjusting layer in the generating neural network to adjust color values for training corresponding to at least part of each of pixels in the initial composite training image, to thereby generate the deceivable composite training image, and (4), after acquiring at least part of at least one deceivability score for training, of the deceivable composite training image, calculated by at least one second discriminator and at least one existence score for training, of the rare object for training in the deceivable composite training image, calculated by an object detection network, has instructed at least one loss layer in the generating neural network to calculate one or more losses by referring to at least part of the deceivability score for training and the existence score for training, to thereby learn at least part of one or more parameters of the generating neural network by backpropagating the losses; configured to execute the instructions to: perform processes of (I) if at least one background test image to be used as a background of the rare event on the deceivable composite test image and at least one rare object test image of at least one rare object for testing corresponding to the rare event are acquired, instructing the locating layer in the generating neural network to generate one or more location candidates for testing of the rare object for testing on the background test image into which the rare object test image is to be inserted, and if each of candidate scores for testing of each of the location candidates for testing calculated by the first discriminator is acquired, instructing the locating layer to select a specific location candidate for testing among the location candidates for testing as an optimal location for testing of the rare object for testing by referring to the candidate scores for testing, (II) instructing the compositing layer in the generating neural network to insert the rare object test image into the optimal location for testing, to thereby generate at least one initial composite test image, and (III) instructing the adjusting layer in the generating neural network to adjust color values for testing corresponding to at least part of each of pixels in the initial composite test image, to thereby generate the deceivable composite test image.

* * * * *